United States Patent
Tyndall

(10) Patent No.: US 7,138,911 B2
(45) Date of Patent: Nov. 21, 2006

(54) POWER CONVERSION FROM PIEZOELECTRIC SOURCE WITH MULTI-STAGE STORAGE

(75) Inventor: Patrick A. Tyndall, Simpsonville, SC (US)

(73) Assignee: Michelin Recherche et Technique S.A. (CH)

( * ) Notice: Subject to any disclaimer, the term of this patent is extended or adjusted under 35 U.S.C. 154(b) by 121 days.

(21) Appl. No.: 10/910,839

(22) Filed: Aug. 4, 2004

(65) Prior Publication Data
US 2006/0028333 A1    Feb. 9, 2006

(51) Int. Cl.
*B60C 23/00*    (2006.01)
(52) U.S. Cl. .................. 340/447; 340/442; 73/146.5
(58) Field of Classification Search .................. 340/447
See application file for complete search history.

(56) References Cited

U.S. PATENT DOCUMENTS

| | | | |
|---|---|---|---|
| 3,760,351 A | 9/1973 | Thomas | |
| 4,061,200 A | 12/1977 | Thompson | |
| 4,160,234 A * | 7/1979 | Karbo et al. | 340/443 |
| 4,237,728 A * | 12/1980 | Betts et al. | 340/447 |
| 4,300,119 A * | 11/1981 | Wiernicki | 340/447 |
| 4,319,220 A | 3/1982 | Pappas et al. | |
| 4,384,482 A * | 5/1983 | Snyder | 340/447 |
| 4,510,484 A | 4/1985 | Snyder | |
| 4,862,486 A | 8/1989 | Wing et al. | |
| 5,457,447 A | 10/1995 | Ghaem et al. | |
| 5,546,070 A | 8/1996 | Ellmann et al. | |
| 5,632,841 A | 5/1997 | Hellbaum et al. | |
| 5,639,850 A | 6/1997 | Bryant | |
| 5,663,496 A | 9/1997 | Handfield et al. | |
| 5,703,474 A * | 12/1997 | Smalser | 323/299 |
| 5,749,984 A | 5/1998 | Frey et al. | |
| 5,781,104 A | 7/1998 | Huang | |
| 5,869,189 A | 2/1999 | Hagood, IV et al. | |

(Continued)

FOREIGN PATENT DOCUMENTS

GB    2307044 A    5/1997

(Continued)

OTHER PUBLICATIONS

John Kymissis, Clyde Kendall, Joseph Paradiso, and Neil Gershenfeld, *Parasitic Power Harvesting in Shoes*, Aug. 1998, Presented at the Second IEEE International Conference on Wearable Computing.

(Continued)

*Primary Examiner*—Daniel Wu
*Assistant Examiner*—Eric M. Blount
(74) *Attorney, Agent, or Firm*—Dority & Manning PA

(57) ABSTRACT

A system and corresponding method for generating electric power from a rotating tire's mechanical energy concerns a piezoelectric power generation device associated with a power harvesting and conditioning module. The piezoelectric structure is preferably mounted within a tire structure such that electric charge is generated therein as the wheel assembly moves along a ground surface. The electrodes of the piezoelectric structure are coupled to a power harvesting and conditioning module that rectifies the resultant electric current from the piezoelectric structure, conditions and stores it in a multi-stage energy storage device, preferably a plurality of capacitors. A regulated voltage source is provided from the energy stored in the power generation device and can be used to selectively power various electronics systems integrated within a tire or wheel assembly. An example of an integrated tire electronics system for use with the disclosed power generation device corresponds to a tire monitoring system that wirelessly transmits such information as tire pressure, temperature and identification variables to a remote receiver location.

15 Claims, 4 Drawing Sheets

U.S. PATENT DOCUMENTS

| | | | |
|---|---|---|---|
| 5,889,464 A * | 3/1999 | Huang | 340/442 |
| 6,048,622 A | 4/2000 | Hagood, IV et al. | |
| 6,175,302 B1 * | 1/2001 | Huang | 340/442 |
| 6,438,193 B1 * | 8/2002 | Ko et al. | 377/24.1 |
| 6,725,713 B1 | 4/2004 | Adamson et al. | |
| 6,737,789 B1 * | 5/2004 | Radziemski et al. | 310/339 |
| 6,798,140 B1 | 9/2004 | Reim et al. | |
| 6,807,853 B1 | 10/2004 | Adamson et al. | |
| 6,853,114 B1 | 2/2005 | Bachmaier et al. | |
| 6,992,423 B1 * | 1/2006 | Mancosu et al. | 310/339 |
| 2003/0011276 A1 | 1/2003 | Nowottnick | |
| 2003/0209063 A1 | 11/2003 | Adamson et al. | |
| 2004/0078662 A1 * | 4/2004 | Hamel et al. | 714/22 |
| 2005/0285569 A1 * | 12/2005 | Rao et al. | 320/128 |
| 2005/0285728 A1 * | 12/2005 | Tyndall | 340/447 |

FOREIGN PATENT DOCUMENTS

| | | |
|---|---|---|
| GB | 2325303 A | 11/1998 |
| WO | WO 0002741 A | 1/2000 |
| WO | 0168388 | 9/2001 |
| WO | 0180327 | 10/2001 |

OTHER PUBLICATIONS

T. Starner, *Human-Powered Wearable Computing*, 1996, IBM Systems Journal, vol. 35, No. 3&4.

J. A. Paradiso, K. Hsiao, A. Y. Benbasat, and Z. Teegarden, *Design and Implementation of Expressive Footwear*, 2000, IBM Systems Journal, vol. 39, No. 3&4.

*Piezoelectric Powered (Batteryless)Radio Frequency Identification Tag For Tires*, pp. 245-246, IBM Technical Disclosure Bulletin, vol. 39 No. 8 Aug. 1996.

EPO Search Report dated Aug. 26, 2003.

Web page link for a device QP15W from Mide, Oct. 13, 2003.

Application Notes for Thunder® device, Face International Corporation, Copyright date 2002.

Michael Patrick Johnson, *Physical Limits of Portable Power Storage*, May 1999, MIT Media Lab, Cambridge, MA.

George A. Rossetti, Jr., Alessandro Pizzochero, and Aaron A. Bent, *Recent Advances in Active Fiber Composites Technology*, Aug. 17, 2000, 12th IEEE International Symposium on the Applications of Ferroelecrics (ISAF 2000).

* cited by examiner

POWER CONVERSION FROM PIEZOELECTRIC SOURCE WITH MULTI-STAGE STORAGE

PRIORITY CLAIM

Field of the Invention

The present invention generally concerns a system and method for converting energy generated by a piezoelectric structure exposed to the mechanical energy of conventional tire rotation, into a form suitable for providing electric power for integrated tire electronics. Piezoelectric technology is utilized to convert mechanical strain associated with tire flexure to electric charge that is then conditioned and stored in one or more energy storage devices. Sufficient accumulations of such stored energy can then power electronic systems including components for identifying various physical tire parameters as well as radio frequency (RF) transmission devices which may transmit tire identification and other data.

BACKGROUND OF THE INVENTION

The incorporation of electronic devices with pneumatic tire structures yields many practical advantages. Tire electronics may include sensors and other components for obtaining information regarding various physical parameters of a tire, such as temperature, pressure, number of tire revolutions, vehicle speed, number of rotations at speed, temperature at speed and other physical and operational parameters as well as manufacturing information such as name of manufacturer, manufacturing location, date of manufacture, etc. Such performance information may become useful in tire monitoring and warning systems, and may even potentially be employed with feedback systems to regulate proper tire pressure levels. For example, differences in tire rotational speed on the same vehicle may be indicative of under or over inflation as the diameter of a tire will change slightly with inflation pressure.

U.S. Pat. No. 5,749,984 (Frey et al.) discloses a tire monitoring system and method that is capable of determining such information as tire deflection, tire speed, and number of tire revolutions. Another example of a tire electronics system can be found in U.S. Pat. No. 4,510,484 (Snyder), which concerns an abnormal tire condition warning system. U.S. Pat. No. 4,862,486 (Wing et al.) also relates to tire electronics, and more particularly discloses an exemplary revolution counter for use in conjunction with automotive and truck tires.

Yet another potential capability offered by electronics systems integrated with tire structures corresponds to asset tracking and performance characterization for commercial vehicular applications. Commercial truck fleets, aviation crafts and earthmover/mining vehicles are all viable industries that could utilize the benefits of tire electronic systems and related information transmission. Tire sensors can determine the distance each tire in a vehicle has traveled and thus aid in maintenance planning for such commercial systems. Vehicle location and performance can be optimized for more expensive applications such as those concerning earth-mining equipment. Entire fleets of vehicles could be tracked using RF tag transmission, exemplary aspects of which are disclosed in U.S. Pat. No. 5,457,447 (Ghaem et al.).

Such integrated tire electronics systems have conventionally been powered by a variety of techniques and different power generation systems. Examples of mechanical features for generating energy from tire movement are disclosed in U.S. Pat. No. 4,061,200 (Thompson) and U.S. Pat. No. 3,760,351 (Thomas). Such examples provide bulky complex systems that are generally not preferred for incorporation with modern tire applications. Yet another option for powering tire electronics systems is disclosed in U.S. Pat. No. 4,510,484 (Snyder), which concerns a piezoelectric reed power supply symmetrically configured about a radiating centerline of a tire.

Another typical solution for powering tire electronics systems corresponds to the use of a non-rechargeable battery, which inherently provides an inconvenience to the tire user since proper electronics system operation is dependent on periodic battery replacement. Conventional batteries also often contain heavy metals that are not environmentally friendly and which present disposal concerns, especially when employed in significant quantities. Still further, batteries tend to deplete their energy storage quite rapidly when powering electronic applications characterized by complex levels of functionality. Battery storage depletion is especially prevalent in electronic systems that transmit information over a relatively far distance such as from truck wheel locations to a receiver in the truck cabin. Even when batteries are used in electronics systems that transmit from wheel locations to a closer receiver location, information is then typically relayed via hard-wire transmission medium from the RF receiver location to the vehicle cab thus requiring the installation of additional and often-expensive communications hardware in a vehicle.

Yet another known method for deriving power for tire monitoring systems relates to scavenging RF beam power with an interrogation antenna in close proximity to a tire and integrated electronic features. Energy that is radiated from the antenna is scavenged to power the electronics, which must often be very specialized ultra-low-power electronics limited to within a few microwatts. Interrogation antennas employed in conjunction with beam-powered electronics must typically be placed in relatively close proximity (within about two feet) to each wheel well due to limited transmission ranges. This typically requires multiple interrogation antennas per vehicle, thus adding to potential equipment costs. Each antenna is also quite susceptible to damage from road hazards, and thus for many reasons may not be the most desirable solution for powering certain tire electronic applications.

In accordance with the present subject matter, it is appreciated that certain advantages of piezoelectric materials have long been recognized. However, such technology is constantly improving, thus potentially affording applications that utilize piezoelectric materials with improved operating capabilities. Examples of relatively new advances in piezoelectric technology are provided in U.S. Pat. No. 5,869,189 (Hagood, IV et al.) and U.S. Pat. No. 6,048,622 (Hagood IV et al.), directed to composites for structural control. The presently disclosed technology concerns further advances in piezoelectric technology such that a piezoelectric power generating device can be combined with a power conversion arrangement and together can be integrated with a tire or wheel assembly for purposes of energy harvesting.

The disclosures of all of the foregoing United States patents are hereby fully incorporated into this application for all purposes by reference thereto. While various tire electronics systems and power generation and conversion systems have been developed, no design has emerged that generally encompasses all of the desired characteristics as hereafter presented in accordance with the subject technology.

BRIEF SUMMARY OF THE INVENTION

In view of the recognized features encountered in the prior art and addressed by the present subject matter, an improved system and method for powering electronic systems integrated within a tire structure has been developed. Piezoelectric technology is utilized to convert mechanical strains associated with tire flexure to electric charge that is then harvested, conditioned and stored in one or more energy storage devices. Sufficient accumulations of such stored energy can then power electronic systems including components for identifying various physical tire parameters as well as radio frequency (RF) transmission devices.

In accordance with more particular aspects of the disclosed technology, one aspect of the present subject matter is to provide a pneumatic tire with integrated self-powered electronic components. Such electronic components are self-powered by energy harvested from integrated piezoelectric structures, and may correspond with numerous electronic applications. One exemplary electronic application concerns a tire monitoring system designed to measure and transmit information regarding one or more selected tire conditions such as pressure and temperature, as well as other information such as the number of tire revolutions or general tire identification variables. Another aspect of the related technology relates to methodology for generating energy to power such electronic devices.

Various features and aspects of the subject tire electronics system and specialized power generating device offer a plurality of advantages. The disclosed technology provides for a self-powered tire electronics system that is not dependent on replacement of batteries. Although batteries and battery-operated devices may still be incorporated with aspects of the present subject matter, many complications regarding tire electronics that are solely powered by batteries are obviated in accordance with the disclosed technology.

Another advantage of the present subject matter is that a tire monitoring system is provided that reduces the amount of required signal hardware relative to conventional tire monitoring systems. By providing a tire monitoring system that is self-powered, no scavenger antennas or multiple receiver locations with additional hardwire connections are required. Components of such a tire monitoring system can be integrated within each individual tire structure on a given vehicle such that a single receiver (typically located in a vehicle cabin) is capable of acquiring information transmitted by each tire's integrated electronics.

Yet another advantage of the present subject matter is that there are fewer limitations regarding the type and amount of electronic equipment capable of utilization within tire and wheel assembly structures. Tire electronics powered by conventional methods other than as in accordance with the disclosed piezoelectric technology are often limited to ultra-low power devices. Devices in accordance with the disclosed technology are not necessarily subject to such extreme power limitations. This advantage further facilitates greater functionality of tire electronics, as more components and/or higher-level equipment may potentially be utilized.

A still further advantage of the present subject matter is that the disclosed system and method for generating power and utilizing such power can be used in accordance with a variety of existing applications. Measurement capabilities, monitoring and warning systems, vehicle feedback systems, and asset tracking potential may be possible for applications such as commercial truck fleets, airplanes, and mining/earthmover equipment.

In one exemplary embodiment of the present subject matter, a pneumatic tire assembly with integrated self-powered electronic components includes a tire structure, an active piezoelectric structure, a power harvesting and conditioning module, and an electronics package. More preferably, the tire structure is characterized by a crown having an exterior tread portion for making contact with a ground surface, bead portions for seating the tire to a wheel rim, exterior sidewall portions extending between each bead portion and the crown, and an inner liner along interior crown and sidewall surfaces. The power harvesting and conditioning module is electrically coupled to the piezoelectric structure to receive electric charge generated within the piezoelectric structure and generate a regulated voltage output. This regulated voltage output then powers selected components in the electronics package. The piezoelectric structure and attached power harvesting and conditioning module may be adhered to the interior crown surface of the tire or the piezoelectric structure could be cured directly into the tire's architecture.

Another exemplary embodiment of the present technology concerns a tire monitoring system for integration with a pneumatic tire structure designed to measure and transmit information relating to one or more preselected tire conditions. More particularly, such a tire monitoring system could include an active piezoelectric structure, a power harvesting and conditioning module, a plurality of sensors, a microcontroller, and an RF transmitter. The piezoelectric structure may be embedded in an epoxy matrix and provided with at least two electrodes, such embodiment preferably being either adhered to an interior portion of the pneumatic tire structure or mounted and cured within the tire structure itself. The power harvesting and conditioning module is electrically coupled to selected electrodes such that the module receives electric current generated within the piezoelectric structure and stores the current in an energy storage device until it is provided as a regulated voltage output. The plurality of sensors is powered by the regulated voltage output and determines information regarding preselected tire conditions. The RF transmitter is electrically connected to and receives information from the microcontroller to modulate a carrier signal and transmit to a remote receiver location.

A still further exemplary embodiment of the disclosed technology corresponds to a methodology for generating, harvesting and conditioning power from piezoelectric materials integrated within a tire and wheel assembly. A first step in such a method involves providing an active piezoelectric structure for incorporation within a selected interior location of the tire and wheel assembly. A next step in the method for generating power corresponds to subjecting the tire and wheel assembly to mechanical strain generally occurring as the tire and wheel assembly rolls along a ground surface resulting in flexure of portions of the tire and wheel assembly and generation of electric current within the provided piezoelectric structure. This generated electric current is then harvested, conditioned and stored in one or more energy storage devices such that a regulated voltage source is available for powering electronic devices associated with the tire and wheel assembly.

Yet a still further exemplary embodiment of the disclosed technology corresponds to a method and apparatus for harvesting and conditioning power from piezoelectric materials employing a multi-stage storage methodology. In accordance with this aspect of the present technology, charge energy generated from piezoelectric material may be stored in divergent storage elements to provide both early availability of low-voltage energy as well as only slightly delayed availability of higher power energy.

Additional aspects and advantages of the present subject matter are set forth in, or will be apparent to, those of ordinary skill in the art from the detailed description herein. Also, it should be further appreciated that modifications and variations to the specifically illustrated, referred and discussed features and steps hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in this summarized section, may include and incorporate various combinations of aspects of features, components, or steps referenced in the summarized objectives above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Figure 1:
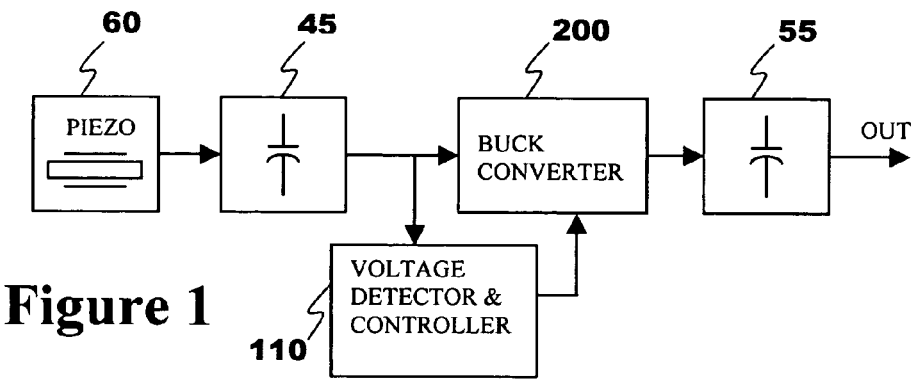
FIG. 1 is a block diagram illustration of an exemplary embodiment of the power generation, harvesting and conditioning arrangement of the present subject matter.

Repeat use of reference characters throughout the present specification and appended drawings is intended to represent same or analogous features or elements of the invention.

DETAILED DESCRIPTION OF THE PREFERRED EMBODIMENTS

As discussed in the Brief Summary of the Invention section, the present subject matter is particularly concerned with an improved system and method for powering electronic systems mounted on or integrated within a tire structure. A power generation device utilizes piezoelectric technology to convert mechanical strain associated with tire flexure to electric current that is then conditioned and stored in one or more energy storage devices. Sufficient accumulations of such stored energy can then power electronic systems, examples of which include components for identifying various physical tire parameters as well as radio frequency (RF) transmission devices.

A power generation device in accordance with the disclosed technology generally includes two exemplary components, a piezoelectric power generating structure and a power harvesting and conditioning module. Aspects of a known exemplary piezoelectric structure are described with reference to FIG. 2 of co-pending U.S. application Ser. No. 10/143,535 filed May 10, 2002 and assigned to the assignee of the present application, which application is incorporated herein for all purposes. Disclosed in that same pending application is an exemplary power-conditioning module (shown as FIG. 3 in that application) that is similar to the known power generation and conditioning circuit presently illustrated in FIG. 7. It should be understood that the examples given are exemplary only and that any piezoelectric structure capable of converting strain from tire flexure could be used.

Figure 7:
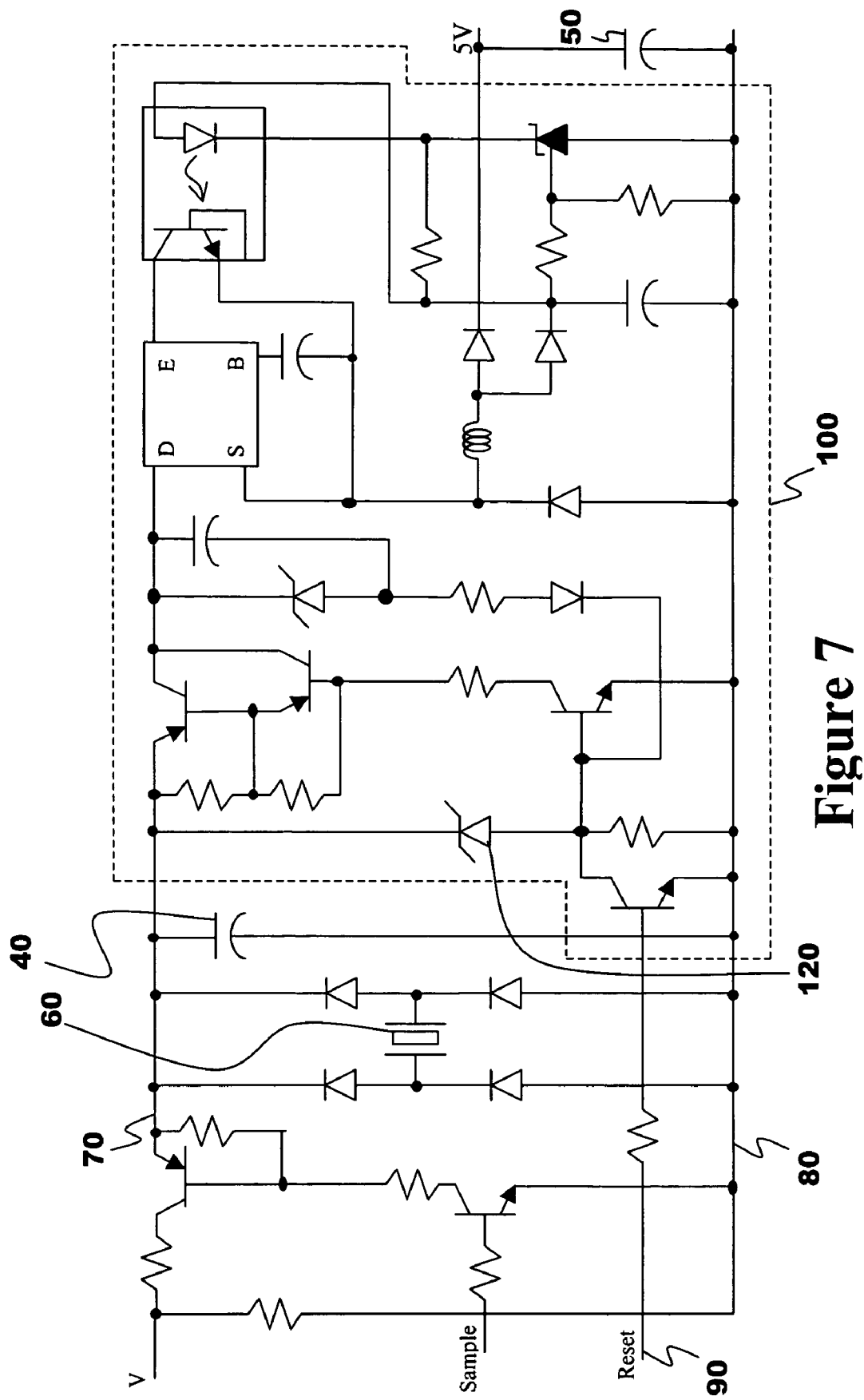
FIG. 7 provides a schematic diagram representation of a known power harvesting and conditioning arrangement.

With more specific reference to FIG. 7, a known converter circuit has been illustrated wherein a piezoelectric element 60 is provided and coupled to a full wave bridge rectifier so as to provide a direct current (DC) voltage across busses 70, 80 upon flexing of the piezoelectric element 60. Piezoelectric element 60 may be attached to or embedded in a tire structure in any suitable manner such that the piezoelectric element is exposed to mechanical flexing resulting from motion or rotation of the host tire. Mechanical flexing of the piezoelectric element 60 produces a relatively high voltage, low current charging of capacitor 40, which is a relative large valued, high voltage device. As the mechanical flexing of the piezoelectric element 60 continues, capacitor 40 accumulates charge until Zener diode 120 conducts, thereby permitting pulse-width modulated closed-loop buck converter 100 to turn on, drain a portion of the stored high voltage, low current energy in capacitor 40, convert the energy into low voltage, high current energy, charge storage capacitor 50, and supply the converted energy to an external device. Capacitor 50 may be a relatively small valued, low voltage device. This type of operation may be referred to as a bulk conversion system since the conversion from stored high voltage, low current energy to low voltage, high current energy is conducted automatically when the input voltage across capacitor 40 reaches a predetermined level.

As can readily be perceived, such bulk conversion systems may create energy supply problems based on a built in delay in providing energy at the time such may be desired. For example, assuming the host tire is actually turning or at least providing flexural mechanical energy to piezoelectric element 60 at the time energy is needed, there would, never-the-less, be a delay from the time of need until such time that the converter can actually convert the energy into a form suitable for use by the external device. Then there is the possibility that the tire may currently not be providing any mechanical energy to the piezoelectric element or has not provided such energy for a period of time such that there is little or no energy stored in capacitor 40 to be converted for use by the external device. Such a condition would produce not only a delay in conversion based on a lack of convertible stored energy but would require a further delay until the tire actually starts moving again.

The present subject matter has been developed in response to these deficiencies in the known power generation, harvesting, and conditioning arrangements. With reference to FIG. 1, the present subject matter is illustrated in block diagram form to demonstrate the basic operation of a new methodology for harvesting and conditioning power generated by piezoelectric strips mounted in a host carrier such as a tire. At this time, it should be noted that, although the present discussion is directed primarily to a vehicle and tire environment, it should be clearly understood that the present technology can be incorporated into any device which can apply a mechanical strain to a piezoelectric strip as a mechanism for generating electrical power that may be harvested and conditioned to provide operating power for a contained electronic device. For example, the present technology may be applied in a geophysical sensor where the act of transporting a host device as well as the actual vibration resulting from vibration inducing events such as earth tremors produces vibration that might be used to generate power to operate a sensor. Other applications might involve use of the present technology to provide self-powered sensors that might be used to detect vibration and other conditions relating to the operation of a machine of almost any description.

With more specific reference to FIG. 1, the present technology employs a piezoelectric element 60 which may be mounted on or within a tire structure, and which is configured to charge capacitor 45 by way of a rectifier configuration in substantially the same manner as piezoelectric element 60 illustrated in the known arrangement of FIG. 7 charged capacitor 40. In the present technology, however, capacitor 45 may correspond to a relative small valued, high voltage capacitor as opposed to the relative large valued, high voltage capacitor 40. A voltage detector and controller 110 is coupled to capacitor 45 and monitors the voltage across capacitor 45. Upon the voltage reaching a threshold level the voltage detector and controller 110 produces a control signal that activates single-cycle buck converter 200. Initiation of the single conversion cycle transfers a small portion of the energy from capacitor 45 to capacitor 55 allowing capacitor 45 to operate within a voltage range which remains close to the optimum power output level. In the present technology, capacitor 55 may be a relatively large valued, low voltage electrolytic, ceramic, or other type capacitor that, when charged by multiple operations of the single-cycle buck converter, functions as the primary high energy storage device for the presently disclosed energy conditioning arrangement.

The general operation just described in accordance with the present technology may be referred to as a "piecemeal conversion" system in contrast to the bulk conversion system previously described. According to the present technology, a conversion cycle is initiated as charge is accumulated, i.e., becomes "available," and exceeds a threshold value across capacitor 45 from the charge generated by the flexure of piezoelectric strip 60. Conversion of such available high voltage into a low voltage, high current form permits immediate operation of any load device drawing operating power from the energy conditioning arrangement of the present technology, thus eliminating the possible delays associated with previously known systems. Additional advantages of the present piecemeal conversion methodology are found in the facts that the resulting converter is simpler, less expensive, physically smaller and lighter in weight than the previously known pulse width modulator type converter. The threshold value at which a single conversion cycle is initiated can be fixed at a particular voltage value, or can be varied as may be required to maintain maximum power output under various operating conditions, such as changing tire load.

Figure 2:
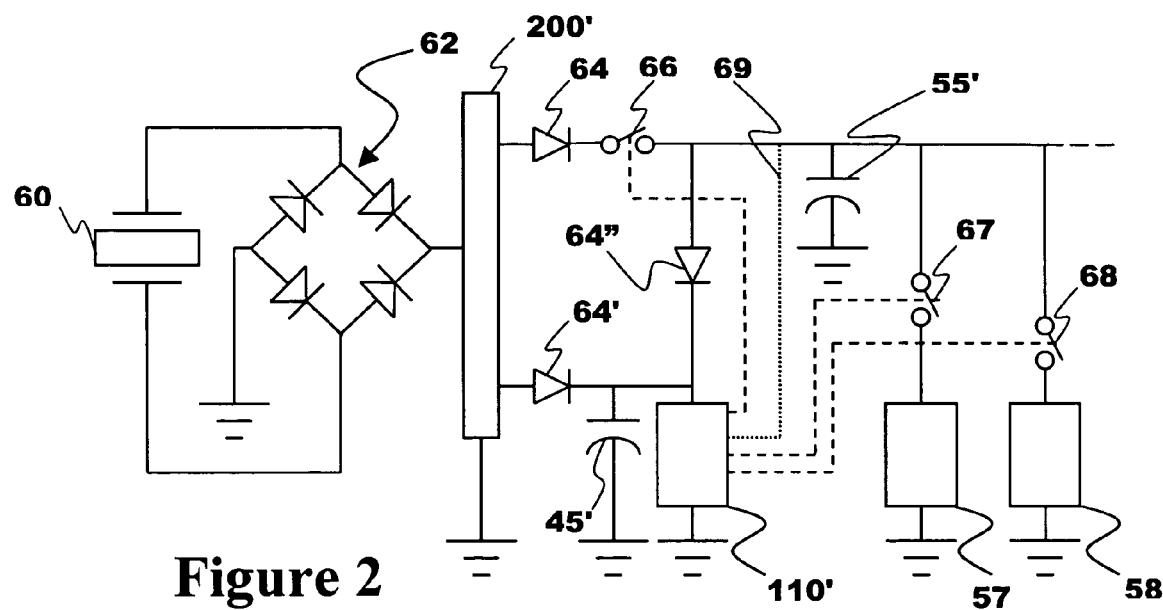
FIG. 2 is a more detailed schematic diagram illustrating a dual stage power harvesting arrangement according to one aspect of the present subject matter.
Figure 3:
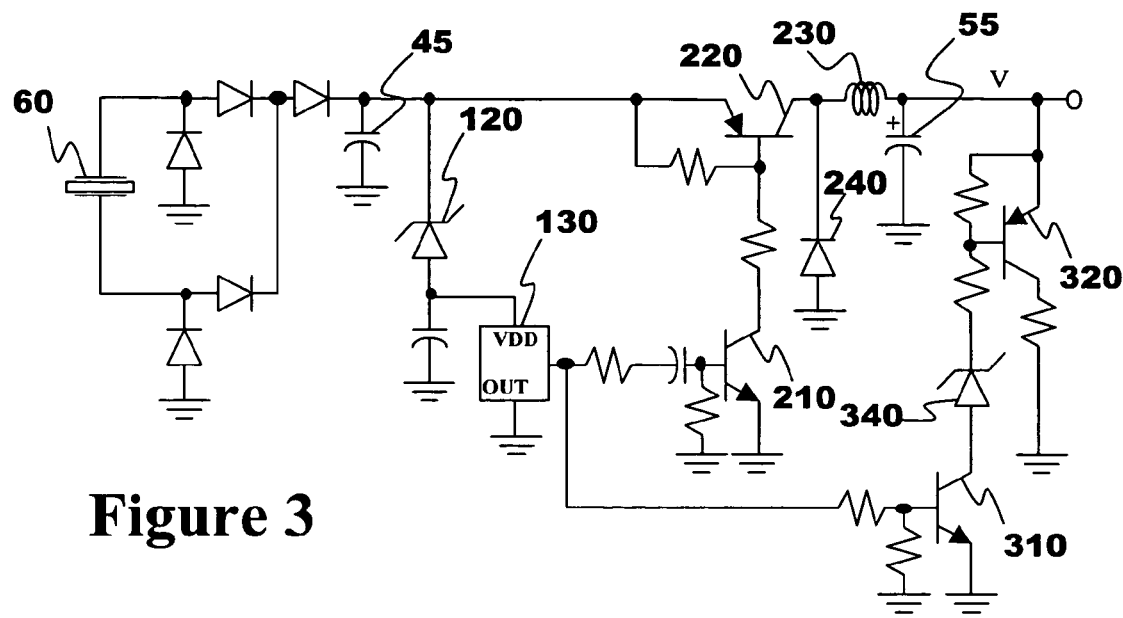
FIG. 3 is a schematic diagram illustrating an exemplary embodiment of the power generation, harvesting and conditioning arrangement of the present subject matter.
Figure 4:
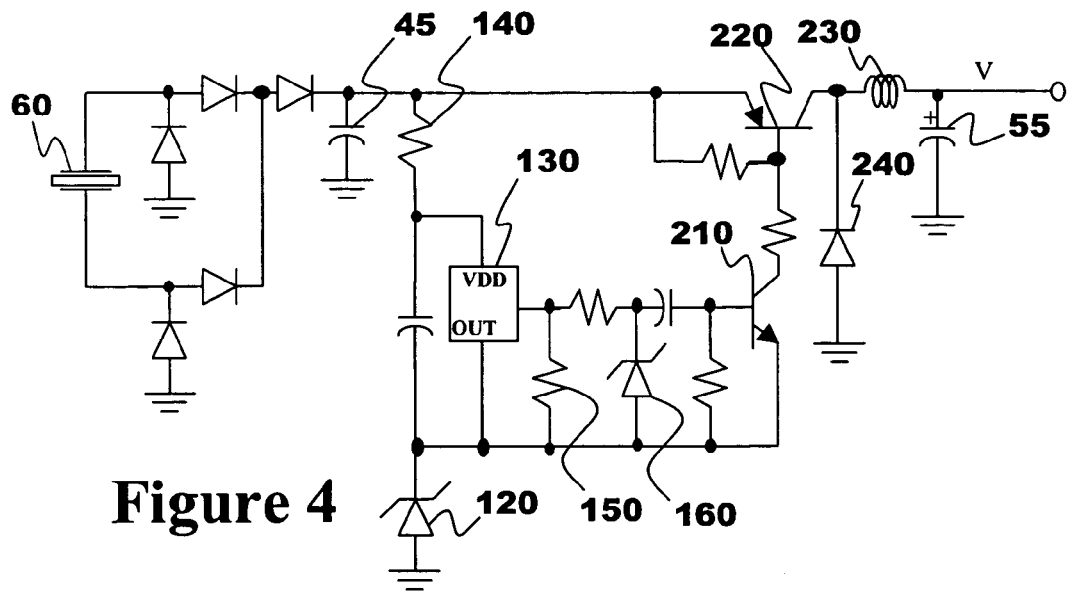
FIG. 4 is a schematic diagram illustrating another exemplary embodiment of the power generation, harvesting and conditioning arrangement of the present subject matter.

The voltage detector and controller 110 may correspond to any of several forms, two exemplary embodiments of which are illustrated in conjunction with FIGS. 3 and 4. As will be discussed more fully later, the embodiments illustrated in FIGS. 3 and 4 represent examples of simple control schemes, however a microcontroller or similar device could alternatively be used to provide more intelligent control of the converter, as will presently be more generally discussed with reference to FIG. 2.

With reference now to FIG. 2, illustrated therein is a schematic view of an alternate arrangement of the conversion system illustrated in FIG. 1. In this alternative embodiment, piezoelectric element 60 is employed in the same manner as in the embodiment of FIG. 1 to provide charge upon flexure of the piezoelectric element 60 concurrently with movement of the host tire. Electric charge produced by the piezoelectric element 60 is passed through a full wave bridge rectifier 62, optional high voltage to low voltage converter 200', optional isolation diode 64 to capacitor 55', and isolation diode 64' to capacitor 45'. Optional diode 64" may be employed as an alternative route for operating power for microcontroller 110' as will be more fully described later. Capacitor 45' is similar to capacitor 45 of FIG. 1 in that it is a relatively small value capacitor as compared to capacitor 55', which like capacitor 55 of FIG. 1 is a relatively larger valued capacitor. High voltage to low voltage converter 200' may or may not be provided depending on the operational voltage requirements of the various control and power consuming devices employed in the system. Thus the operating voltage specifications for capacitors 45' and 55' may vary from those of capacitors 45 and 55 of FIG. 1 depending on whether or not optional high voltage to low voltage converter 200' is provided.

Regardless of the operational voltage requirements of the various components of the system and whether or not optional high voltage to low voltage converter 200' is provided, capacitor 45', as was capacitor 45 of FIG. 1, is selected to have a relatively small capacitance value such that the capacitor may charge quickly to permit rapid turn-on of microcontroller 110' or, in other application, any other low power requirement device. In this manner microcontroller 110' is able to immediately begin those tasks that might require relatively little power, such as reading various sensors, counting revolutions, etc. Capacitor 55', due to its relatively larger capacitance value, charges more slowly and under voltage regulating control of microcontroller 110' by way of electronic switch 66. As slower charging capacitor 55' charges, the voltage there across may be monitored as a type of "fuel gage" by microcontroller 110' by way of connecting line 69. Connecting line 69 may be employed as a sensing line as well as a power feed line as will be discussed more later.

As "fuel" in the form of accumulated electric charge on capacitor 55' becomes available, microcontroller 110' may operate electronic switches 67, 68 to selectively apply such accumulated electric charge to higher power consuming devices 57, 58 and/or other higher power consuming functions. Power consuming devices 57, 58 may include elements such as additional sensors, RF or other types of transmitter devices, memory storage devices, or any other devices requiring relatively high operating power. Other higher power consuming functions may correspond to higher power requiring functions performed by the normally low power requiring microcontroller. For example, as higher power becomes available, those functions carried out by the microcontroller that require intensive computations or storage of data to onboard memory elements will be made possible by supplying supplemental energy to the microcontroller from the higher valued capacitor 55' through, for example, connecting line 69 or another dedicated energy supply line. Further, it is also possible to supply supplemental energy to support longer term operation of the low power requirement microcontroller during periods when the low valued capacitor 45' may have exhausted its charge during extended idle periods as, for example, if the vehicle is at stand still for a period of time. Such supplemental energy might be supplied through connecting line 69 or through optional diode 64". It should be strictly understood that although two power consuming devices have been illustrated, any number of such devices and corresponding serially connected microcontroller controlled electronic switches as well as higher power requiring functions of normally low power requirement devices may be provided as needed or required by the particular application to which the combination may be applied.

In accordance with the present subject matter, when an electronic device mounted on or within a tire requires operating energy, lower level energy is almost immediately available. The low voltage energy storage device may correspond to multiple devices or stages, including, but not limited to the previously described capacitors 45, 45', 55, and 55'. The storage device may, for example, correspond to one or more capacitors, super capacitors, and various types of rechargeable devices such as batteries, thereby allowing both rapid power-up and longer term energy storage for extended operation of the powered electronic device even when the tire is stopped or turning only very slowly. In addition, various combinations of multi-stage storage devices may be provided. For example, depending on the particular application to which the present technology may be applied, a first multi-stage storage device may be provided to supply multiple relatively high voltage sources, a first one that is quickly available by virtue of employing a small capacitance valued storage device, and a second, higher power capable storage device, that becomes available through controlled charge transfer from the smaller capacitance valued storage device. Accompanying such a first multi-stage storage device might be a second, or even third or more, such device that may, optionally, include a high voltage to low voltage converter, so that between two such multi-stage storage devices (or among three, or more), multiple voltage levels and power supply capabilities may be accommodated.

With reference to FIG. 3, there is illustrated an exemplary embodiment of the power harvesting and conditioning arrangement of the present technology using a fixed threshold voltage as determined by Zener diode 120, a simple voltage detector 130 to control a classic buck regulator, and a single stage primary energy storage device embodied as capacitor 55. Voltage detector 130 may, for example, correspond to a type S-80825, 2.5-volt output voltage detector while Zener diode 120 may correspond to a device rated at 33 volts. Since the average current supplied by the piezoelectric strip 60 is extremely low, the output of voltage detector 130 is inherently monostable and it operates as a relaxation oscillator producing a single output pulse every time the voltage threshold is exceeded. It is important to note that a single revolution of the tire may result in not just one conversion cycle, but rather may produce several conversion cycles, if the amount of energy transferred from capacitor 45 to capacitor 55 per conversion cycle is less than the energy delivered by the piezoelectric strip 60 in one revolution of the tire. Conversely, if the energy delivered by the piezoelectric strip in one revolution is less than that transferred by a single conversion cycle, there may be less than one conversion cycle per revolution, on average. Transistors 310, 320 and Zener diode 340 together with the illustrated unnumbered associated resistors correspond to a strobed, low leakage shunt regulator. Any of several other known voltage regulating arrangements may be used, however, in place of the strobed regulator presently illustrated, as would be apparent to those of ordinary skill in the relevant technology. Such regulators may be used to maintain the output voltage of the converter at a prescribed value suitable for use by any electronic devices to be powered by the power conditioning circuit of the present subject matter. In an exemplary embodiment, the voltage regulator may maintain the output voltage across capacitor 55 at a selected value in a range from about 3.0 volts to about 5.0 volts. As would be evident to those of ordinary skill in the art, transistors 210 and 220, inductor 230, diode 240 and the other unnumbered related components constitute the aforementioned classic buck converter that provides charge transfer from capacitor 45 to output capacitor 55.

With respect to FIG. 4, there is illustrated another exemplary embodiment of the power harvesting and conditioning circuit of the present subject matter. The exemplary embodiment illustrated in FIG. 4 differs from that of FIG. 3 in two respects. First, no shunt regular is illustrated as was illustrated in FIG. 4. This omission should not be taken as an indication that such a regulator should not be used but rather that the regulator was simply omitted for simplicity. Secondly, the positions of the Zener diode 120 and voltage detector 130 have been interchanged. In addition to these changes, resistors 140 and 150 and Zener diode 160 have been added to assist in transient suppression control for the voltage detector and controller circuit. The power harvesting and conditioning embodiment illustrated in FIG. 4 operates in substantially the same manner as the embodiment illustrated in FIG. 3. That is, when the voltage across capacitor 45 builds to a level determined by the combined values of Zener diode 120 and voltage detector 130, a pulse is generated at the output terminal of the voltage detector that then permits the classic buck converter comprising transistors 210 and 220, inductor 230, diode 240 and the other unnumbered related components to transfer charge from capacitor 45 to output capacitor 55. The output of the power harvesting and conditioning module may then preferably be used to power electronics systems within a tire or wheel assembly. An example of a tire electronics system, including sensors, a microcontroller, and an RF transmitter is presented in FIG. 6 and will be described more fully later.

Figure 5:
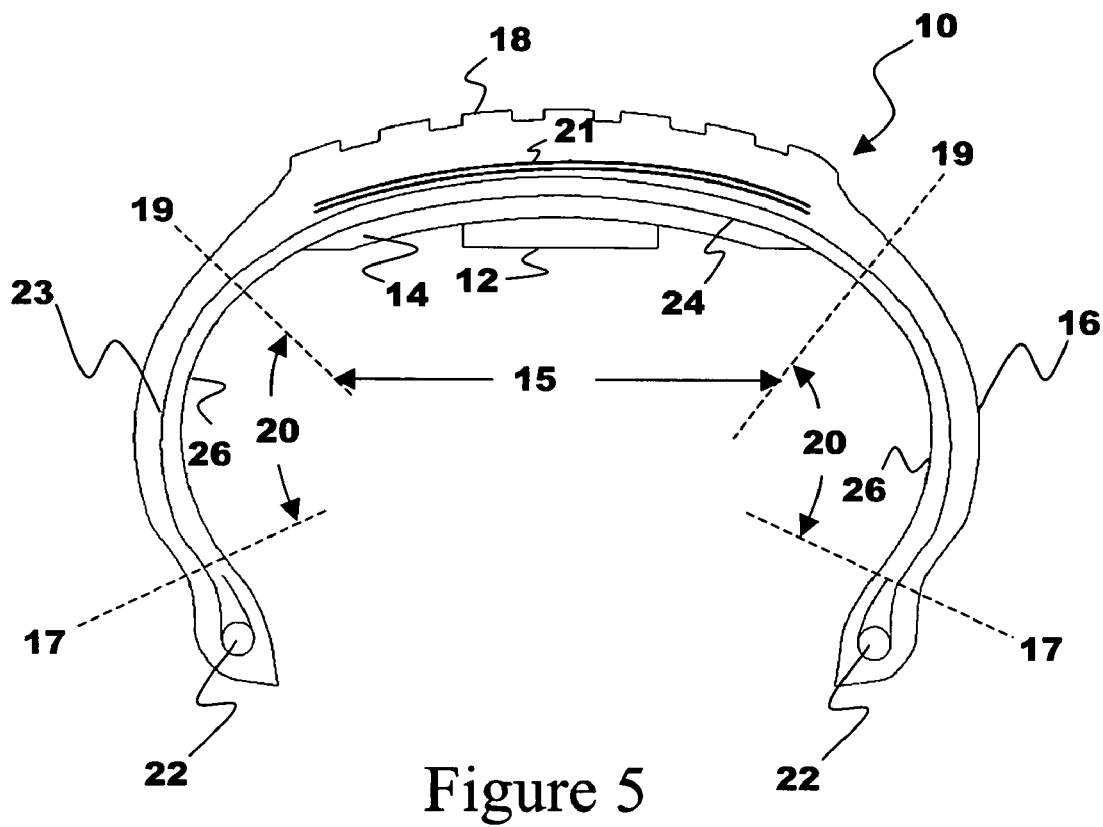
FIG. 5 displays a generally cross-sectional view of an exemplary pneumatic tire structure with integrated self-powered electronic components in accordance with the present subject matter.

Reference will now be made in detail to the presently preferred embodiments of the subject system and method of generating power for electronics systems integrated within a tire or wheel assembly. Referring now to the drawings, FIG. 5 provides a generally cross-sectional view of an exemplary pneumatic tire assembly 10 with integrated self-powered electronic components 12 (more specifically illustrated in FIG. 6) in accordance with the present subject matter. It should be specifically understood that, while the exemplary tire cross-section illustrated herein may be more commonly recognized as a more or less conventional pneumatic tire, the present subject matter is not limited to association with such tires but may also be associated with so called run-flat tires which generally have a somewhat different cross-section from that presently illustrated.

Figure 6:
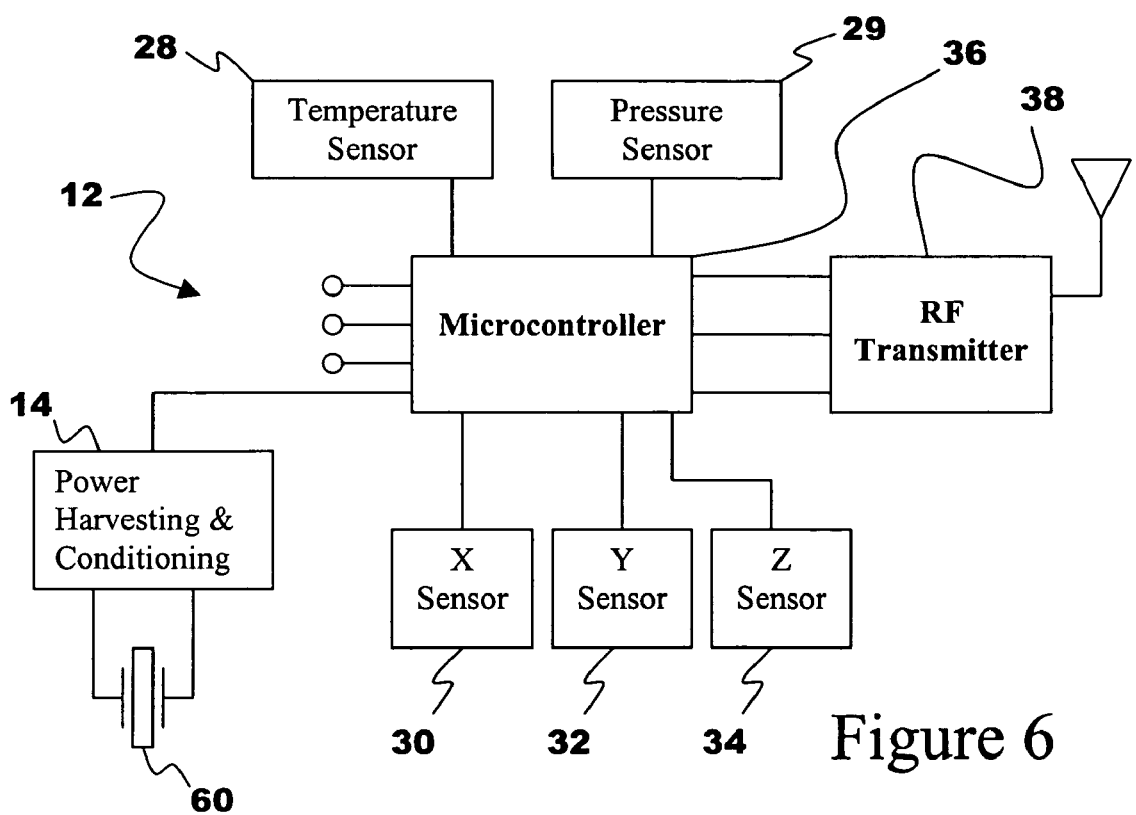
FIG. 6 provides a block diagram representation of an exemplary tire electronics system in accordance with the disclosed technology.

A power generation device 60 and power harvesting and conditioning circuit 12 are preferably provided in conjunction with electronic components 28, 29, 30, 32, 34, 36, 38 associated with tire structure 16 such that the electronics components are self-powered within the tire assembly 10. As illustrated in FIG. 6, electronic components 28 and 29 are illustratively shown as temperature and pressure sensors respectively while components 30, 32, and 34 are generically illustrated as sensors X, Y, and Z which may correspond to any desired sensing elements or, may also correspond to information storage devices functioning in a manner similar to sensors in that data relative to the associated tire is transmitted from the "sensor" through the microprocessor 36 and through the RF transmitter 38 to an external receiving device (not shown) in a manner similar to that in which temperature and pressure data is transmitted from sensors 28 and 29. As a non-limiting example only, "sensors" 30, 32, and 34 may correspond to additional physical environment responsive devices, for example, additional temperature or pressure sensitive devices that may be located separately from sensors 28 and 29, vehicle speed sensors, tire rotation sensors, tire deflection sensors, or other physical or operational type sensors, or may correspond to information storage devices that contain information corresponding to manufacturer, date of manufacture, product information, and other such data as may be associated with the tire or combinations of thereof. It should be appreciated, therefore, that in accordance with the disclosed technology other electronic devices other than those specifically disclosed in the present specification may be utilized with the subject power generation technology. U.S. Pat. No. 5,749,984 discloses other aspects of a tire monitoring system that may be employed with the present subject matter, and such patent is hereby incorporated by reference for all purposes. A tire electronics system may be coupled with a global positioning system (GPS) to pinpoint a vehicle's precise location. A piezoelectric power generating, harvesting and conditioning arrangement may alternatively be utilized to power light assemblies or feedback systems in a wheel assembly. The number of electronics applications capable of being powered in accordance with aspects of the disclosed technology are vastly numerous and should in no way be limiting to the present subject matter.

The capabilities of the subject power generation, harvesting and conditioning devices offer numerous advantages over conventional techniques for providing power within a tire assembly. Antenna beam power scavenging techniques, as previously discussed, are no longer one of limited options to choose from for powering tire electronics. As such, the functional capabilities of many types of tire electronics are generally increased. The option of utilizing batteries for power generation is no longer essential, thus avoiding costly and cumbersome battery replacement. Although the presently disclosed technology provides for a power generation device that enables antenna beam power and batteries to be eliminated, it should be appreciated that a power generation device could employ a hybrid combination of piezoelectric technology and/or batteries and/or antenna beam scavenging to power different selected electronic components within a wheel assembly.

As illustrated in FIG. 5, a typical tire structure 16 is characterized by a crown 15 that supports an exterior tread portion 18 and sidewalls 20 that extend to bead portions 22. Sidewalls 20 generally extend between section lines 17 and 19 and the tire crown 15 generally extends between the two section lines 19. Tire beads 22 are generally provided such that the tire structure 16 can be effectively seated to the rim of a wheel assembly. An inner liner of air-impermeable material forms the interior surface of the tire, including interior crown surface 24 and interior sidewall surfaces 26. A carcass 23 extends between beads 22 across sidewall portions 20 and crown 15, and under inflation pressure defines the tire's shape and transmits forces for traction and steering. Belt package 21 is provided within tire structure 16 generally along the crown 15.

Power generating, harvesting and conditioning device 14, as illustrated in the exemplary tire assembly embodiment of FIG. 5, may be mounted to the interior crown surface 24 of tire structure 16. This location is generally well suited for actuation of the piezoelectric element within device 14, as the exterior tread portion 18 moves along a ground surface and results in flexure of the tire structure 16. This tire flexure coupled with the general mechanical vibrations as the tire assembly 10 moves along a surface enables a piezoelectric structure within the power generation device 14 to generate electric current, which is then conditioned and stored in an energy storage device for powering the tire electronics 12. Although the interior crown surface 24 is a logical location for mounting power generation device 14, it should be appreciated that device 14 may also be mounted to a location such as an interior sidewall surface 26. Such location may offer less strain on the piezoelectric element within the device 14 while still providing enough power generation for certain electronic applications. Further, device 14 could be mounted and cured within tire structure 16; for example, between carcass 23 and the inner liner provided along surfaces 24 and/or 26. In accordance with the variety of possible locations for device 14, it should be understood that the term "integrated" generally encompasses all possible locations, including being mounted on or in a tire structure.

The piezoelectric element power generating element could comprise a variety of piezoelectric materials as discussed in the aforementioned copending application, which has been incorporated by reference and may be referred to for further specific details relating to the piezoelectric element per se.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A pneumatic tire assembly with integrated self-powered electronic components, said tire assembly comprising:

a tire structure characterized by a crown having an exterior tread portion for making contact with a ground surface, bead portions for seating said tire to a wheel rim, exterior sidewall portions extending between each bead portion and the crown, and interior crown and sidewall surfaces;

a piezoelectric structure integrated with a selected portion of said tire structure such that said piezoelectric structure generates electrical energy concurrently with flexure of said tire structure;

a power harvesting and conditioning module electrically coupled to said piezoelectric structure for receiving electric energy generated therein and for providing a plurality of output voltages upon flexure of said tire structure; and an electronics package connected to said power harvesting and conditioning module such that selected functionality of said electronics package is powered by selected of the plurality of output voltages.

2. A pneumatic tire assembly as in claim 1, wherein said power harvesting and conditioning module comprises a voltage rectifier for rectifying the electrical energy generated by said piezoelectric structure, and at least two energy storage devices for storing the rectified electrical energy.

3. A pneumatic tire assembly as in claim 2, wherein said voltage rectifier is a full bridge rectifier and wherein said at least two energy storage devices comprise capacitors.

4. A pneumatic tire assembly as in claim 2, wherein said at least two energy storage devices comprises a first storage device for receiving the rectified energy from the voltage rectifier and a second storage device, and further comprising a controller for controlling transfer of energy from the rectifier to the second storage device.

5. A pneumatic tire assembly as in claim 4, wherein said controller is a microcontroller.

6. A pneumatic tire assembly as in claim 4, wherein both said first storage device and said second storage device are capacitors and wherein the capacitive value of said first storage device is less than the capacitive value of said second storage device.

7. A pneumatic tire assembly as in claim 4, wherein the operating voltage of the first storage device is higher than the operating voltage of the second storage device.

8. A tire monitoring system for integration with a pneumatic tire structure designed to measure and transmit information relating to preselected tire conditions, said tire monitoring system comprising:

a piezoelectric structure;

a power harvesting and conditioning module electrically coupled to said piezoelectric structure for receiving electric charge generated within the piezoelectric structure, for storing the charge within the power conditioning module, and for generating a plurality of output voltages;

at least one sensor for determining information about at least one preselected tire condition, a microcontroller connected to said power harvesting and conditioning module and to said at least one sensor for processing the information received from said at least one sensor and for generating select information indicative of at least one preselected tire condition; and an RF transmitter electrically connected to said microcontroller for receiving select information from said microcontroller, modulating the select information on a carrier signal, and transmitting the select information.

9. A tire monitoring system as in claim 8, wherein said power conditioning module comprises a voltage rectifier for rectifying the electrical energy generated within said piezoelectric structure, a plurality of energy storage devices for storing the electrical energy, and a voltage regulator.

10. A tire monitoring system as in claim 9, wherein said voltage rectifier is a full bridge rectifier and wherein said storage device comprises a plurality of capacitors.

11. A tire monitoring system as in claim 10, wherein the voltage regulator maintains an output voltage at a selected level from about three volts to about five volts.

12. A tire monitoring system as in claim 10, wherein a plurality of sensors are provided, selected ones of which provide information about the temperature and pressure within a pneumatic tire structure.

13. A tire monitoring system as in claim 8, wherein the select information generated by said microcontroller is indicative of selected of the temperature and pressure of the tire structure, the number of tire revolutions that the tire structure has been subjected to, and a tire identification tag.

14. A method for generating power from piezoelectric materials integrated within a wheel assembly, said method comprising the following steps:

providing a piezoelectric structure, wherein said piezoelectric structure is positioned along a selected location within the interior of the wheel assembly;

subjecting the wheel assembly to mechanical strain generally occurring as the wheel assembly rolls along a surface resulting in flexure of portions of the wheel assembly and generation of electric current within the provided piezoelectric structure;

conditioning the electric current generated within the piezoelectric structure; and storing the conditioned electric current in a plurality of storage devices such that a voltage source is immediately available for powering electronic devices associated with the wheel assembly.

15. A method for generating power as in claim 14, wherein said conditioning step comprises rectifying the electric current generated within the piezoelectric structure.

* * * * *